(12) United States Patent
Martin et al.

(10) Patent No.: US 9,797,329 B2
(45) Date of Patent: Oct. 24, 2017

(54) METHOD FOR DIAGNOSING A VACUUM ACTUATOR

(71) Applicant: Ford Global Technologies, LLC, Dearborn, MI (US)

(72) Inventors: Douglas Raymond Martin, Canton, MI (US); Gilbert Fournelle, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 14/535,775

(22) Filed: Nov. 7, 2014

(65) Prior Publication Data
US 2016/0131066 A1    May 12, 2016

(51) Int. Cl.
| | | |
|---|---|---|
| F02D 41/22 | (2006.01) | |
| F02D 41/18 | (2006.01) | |
| F02D 41/00 | (2006.01) | |
| F02M 35/10 | (2006.01) | |
| F02M 35/104 | (2006.01) | |

(52) U.S. Cl.
CPC ........... F02D 41/221 (2013.01); F02D 41/18 (2013.01); *F02D 41/0002* (2013.01); *F02D 2200/0406* (2013.01); *F02D 2200/0414* (2013.01); *F02M 35/104* (2013.01); *F02M 35/10229* (2013.01); *Y02T 10/40* (2013.01)

(58) Field of Classification Search
CPC ..... F02D 2200/0406; F02D 2200/0414; F02D 41/0002; F02D 41/18; F02D 41/221; F02D 2200/0408; F02M 35/10229; F02M 35/104; F02M 35/10236; F02M 35/10209; F02M 3/09; F02M 2026/0025; F02M 2026/002

USPC ............. 123/339.28, 406.67–46.73, 568.25, 123/568.28–568.32; 701/103
See application file for complete search history.

(56) References Cited

U.S. PATENT DOCUMENTS

| | | | | |
|---|---|---|---|---|
| 5,542,388 | A * | 8/1996 | Ichinose | ............... F02B 31/085 123/179.18 |
| 5,823,163 | A * | 10/1998 | Hoshi | ..................... F02D 11/08 123/179.18 |
| 6,393,345 | B1 | 5/2002 | Kerns et al. | |
| 6,684,689 | B2 * | 2/2004 | Fromm | ................. F02B 31/085 73/114.31 |
| 6,715,476 | B2 | 4/2004 | Gopp et al. | |
| 6,735,942 | B2 | 5/2004 | Wild et al. | |
| 7,152,933 | B2 | 12/2006 | Collins et al. | |
| 7,664,595 | B2 * | 2/2010 | Groer | ..................... G01M 15/04 701/103 |

(Continued)

OTHER PUBLICATIONS

Glugla, Chris P. et al., "Dedicated-EGR Cylinder with Variable Charge Motion," U.S. Appl. No. 14/454,275, filed Aug. 7, 2014, 56 pages.

*Primary Examiner* — Carlos A Rivera
*Assistant Examiner* — Carl Staubach
(74) *Attorney, Agent, or Firm* — Julia Voutyras; McCoy Russell LLP

(57) ABSTRACT

Methods and systems are described for diagnosing degradation of a vacuum actuator in an engine system. An example method comprises indicating degradation of the vacuum actuator based on an estimate of flow of air into and out of a vacuum reservoir. The estimate is further based on flow of air generated via each of an aspirator in the intake system, an actuation of the vacuum actuator, and leakage during the actuation of the vacuum actuator.

5 Claims, 6 Drawing Sheets

(56) References Cited

U.S. PATENT DOCUMENTS

| | | | |
|---|---|---|---|
| 8,567,239 B2* | 10/2013 | Cunningham | G01M 3/26 73/114.37 |
| 8,683,800 B2 | 4/2014 | Cunningham et al. | |
| 8,726,872 B2 | 5/2014 | White et al. | |
| 2002/0104516 A1* | 8/2002 | Kaiser | F02M 25/0809 123/520 |
| 2008/0040013 A1* | 2/2008 | Detlefs | B60T 13/68 701/78 |
| 2012/0318047 A1* | 12/2012 | Cunningham | G01M 3/26 73/40 |
| 2014/0165962 A1 | 6/2014 | Pursifull | |

* cited by examiner

METHOD FOR DIAGNOSING A VACUUM ACTUATOR

TECHNICAL FIELD

The present application relates to evaluating a vacuum actuator based on available vacuum fill in a vacuum reservoir.

BACKGROUND AND SUMMARY

Vacuum may be used to operate or to assist in the operation of various devices of a vehicle. For example, vacuum may be used to assist a driver applying vehicle brakes, fuel vapor purging, heating and ventilation system actuation, and actuation of various valves such as a wastegate, a charge motion control valve (CMCV), etc. CMCVs may be coupled upstream of intake valves of engine cylinders in order to increase or decrease the charge motion of a corresponding cylinder, thereby increasing or decreasing the cylinder burn rate, respectively. Vacuum to actuate these valves may be obtained from an engine intake manifold in normally aspirated engines because the intake manifold pressure is often at a pressure lower than atmospheric pressure. When vacuum in the engine intake manifold is not sufficient, vacuum to actuate these valves may be received from a vacuum reservoir.

Diagnostic tests on vacuum actuated valves may be performed intermittently to identify degraded functionality. As an example, diagnostics may determine if a plate of the CMCV is stuck open (or stuck closed) based on a response of a position sensor coupled to the CMCV. If the position sensor does not indicate a change in position in response to an actuation command, the functionality of an actuator of the CMCV may be diagnosed as degraded. Accordingly, a diagnostic code may be flagged in a control system indicating a degraded actuator. However, diagnostic tests may incorrectly diagnose the vacuum actuator as degraded when adequate vacuum is not available to actuate the vacuum actuator. As such, incorrect diagnoses may result in false diagnostic codes being set which can lead to unnecessary testing and expenses. Overall, maintenance costs may increase leading to customer dissatisfaction.

The inventors herein have recognized the above issue and identified an approach to at least partly address the issue. In one example approach, a method is provided to diagnose degradation of a vacuum actuator. The method comprises indicating degradation of the vacuum actuator based on an estimate of flow of air into and out of a vacuum reservoir, the estimate based on flow of air generated via each of an aspirator in the intake system, an actuation of the vacuum actuator, and leakage during the actuation of the vacuum actuator. Thus, incorrect diagnoses of vacuum actuator degradation due to insufficient vacuum levels in the vacuum reservoir may be reduced.

For example, an engine may include one or more vacuum actuated CMCVs positioned in an intake passage downstream of an intake throttle and upstream of one or more intake valve(s) of cylinders. As such, the CMCVs may be actuated by a vacuum actuator that may source vacuum from either the intake manifold or a vacuum reservoir. During conditions when manifold vacuum is not adequate for actuating the CMCV(s), supplementary vacuum may be drawn from the vacuum reservoir. The vacuum reservoir may be fluidically coupled to each of the intake manifold of the engine, a suction port of an aspirator, and to one or more CMCVs. A total amount of vacuum fill in the vacuum reservoir may be estimated based on flow of air into the vacuum reservoir and flow of air out of the vacuum reservoir. Air may flow into the vacuum reservoir when actuating the CMCVs, and air may flow out of the vacuum reservoir towards the intake manifold and/or the suction port of the aspirator. If the amount of vacuum fill in the vacuum reservoir is estimated to be lower than a threshold level, adequate vacuum may not be available to actuate the CMCV(s). Accordingly, if actuation of the CMCV(s) does not produce a change in a position sensor coupled to the CMCV(s), the control system may not indicate that the CMCV is degraded. On the other hand, if the amount of vacuum fill in the vacuum reservoir is higher than a threshold level and actuation of the CMCV(s) does not produce a change in the position sensor, the CMCV(s) may be determined to be degraded.

In this way, degradation of a vacuum actuator may be more accurately determined based on estimating a total amount of vacuum fill in a vacuum reservoir coupled to the vacuum actuator. By determining that an available quantity of vacuum in the vacuum reservoir is lower than a desired quantity, non-responsiveness of the vacuum actuator may be attributed to a lack of vacuum in the vacuum reservoir. Accordingly, indications of vacuum actuator degradation during diagnostic routines may be diminished, particularly when vacuum fill in the vacuum reservoir is lower than desired. As such, diagnostic routines may be completed without a malfunction indicator light being actuated. This in turn may reduce needless and costly diagnostics, and unnecessary maintenance from being carried out.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
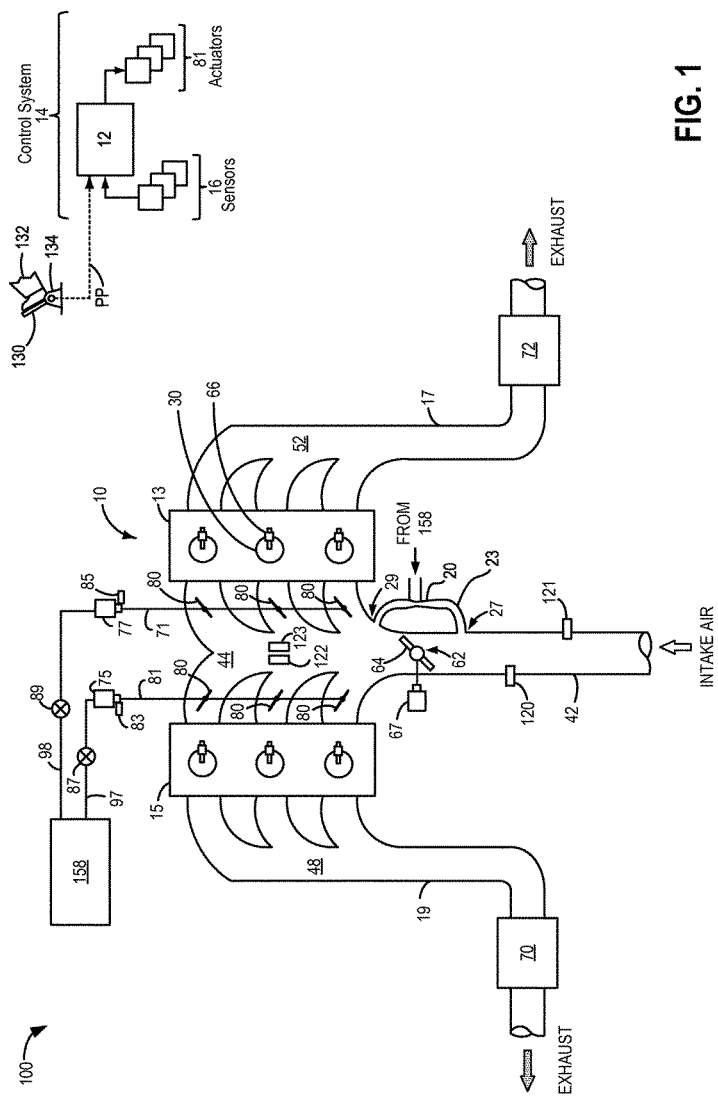
FIG. 1 is a schematic diagram of an engine.
Figure 2:
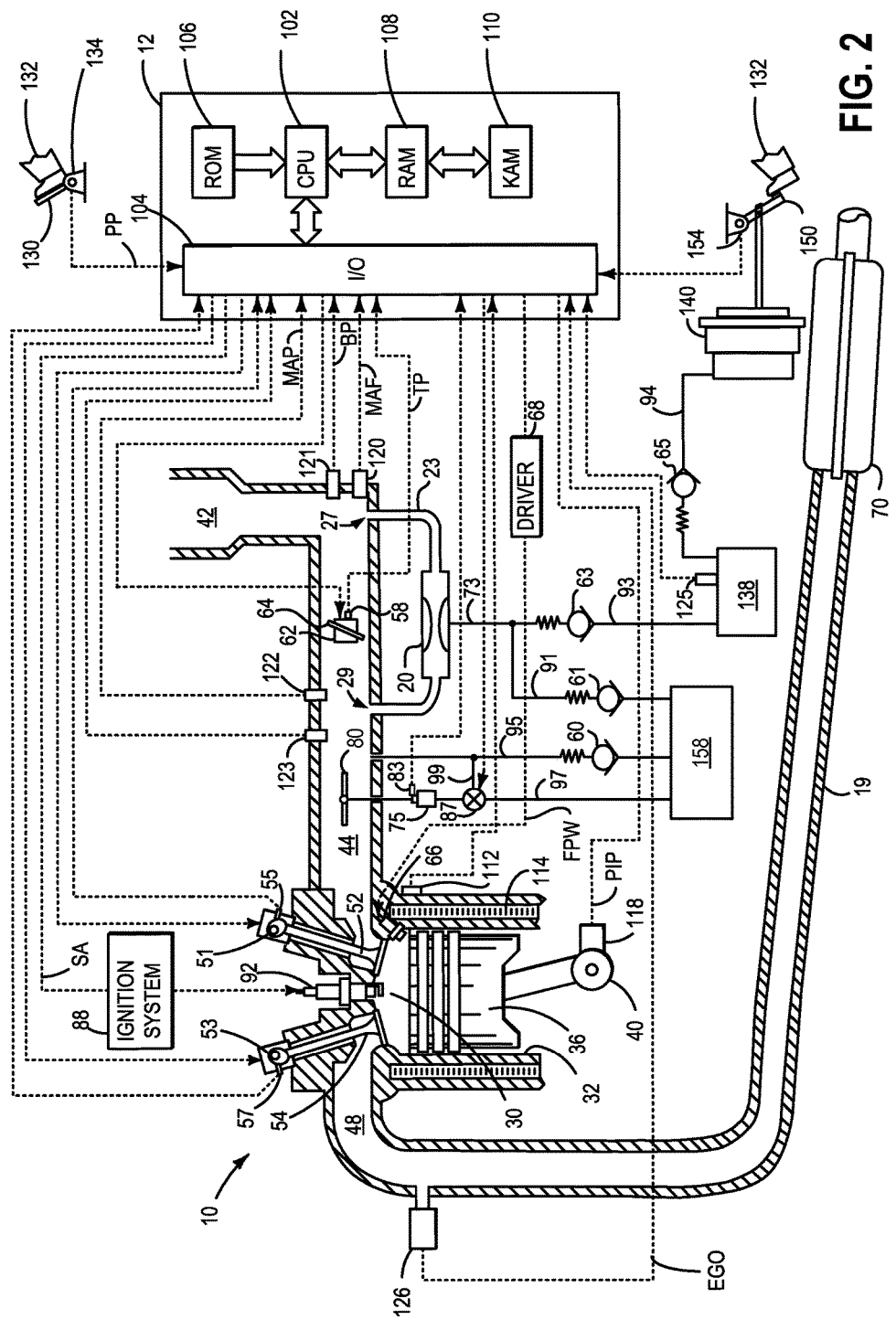
FIG. 2 shows a schematic illustration of a single cylinder within the engine of FIG. 1.

The following description relates to systems and methods for determining degradation in a vacuum actuated valve, such as a charge motion control valve (CMCV), positioned in an intake of an engine system, such as the engine depicted in FIGS. 1 and 2. An actuator of the vacuum actuated valve may receive vacuum from either an engine intake manifold or a vacuum reservoir. Degradation of the actuator and/or vacuum actuated valve may be indicated when the vacuum actuated valve does not change position upon actuation.

Figure 4A:
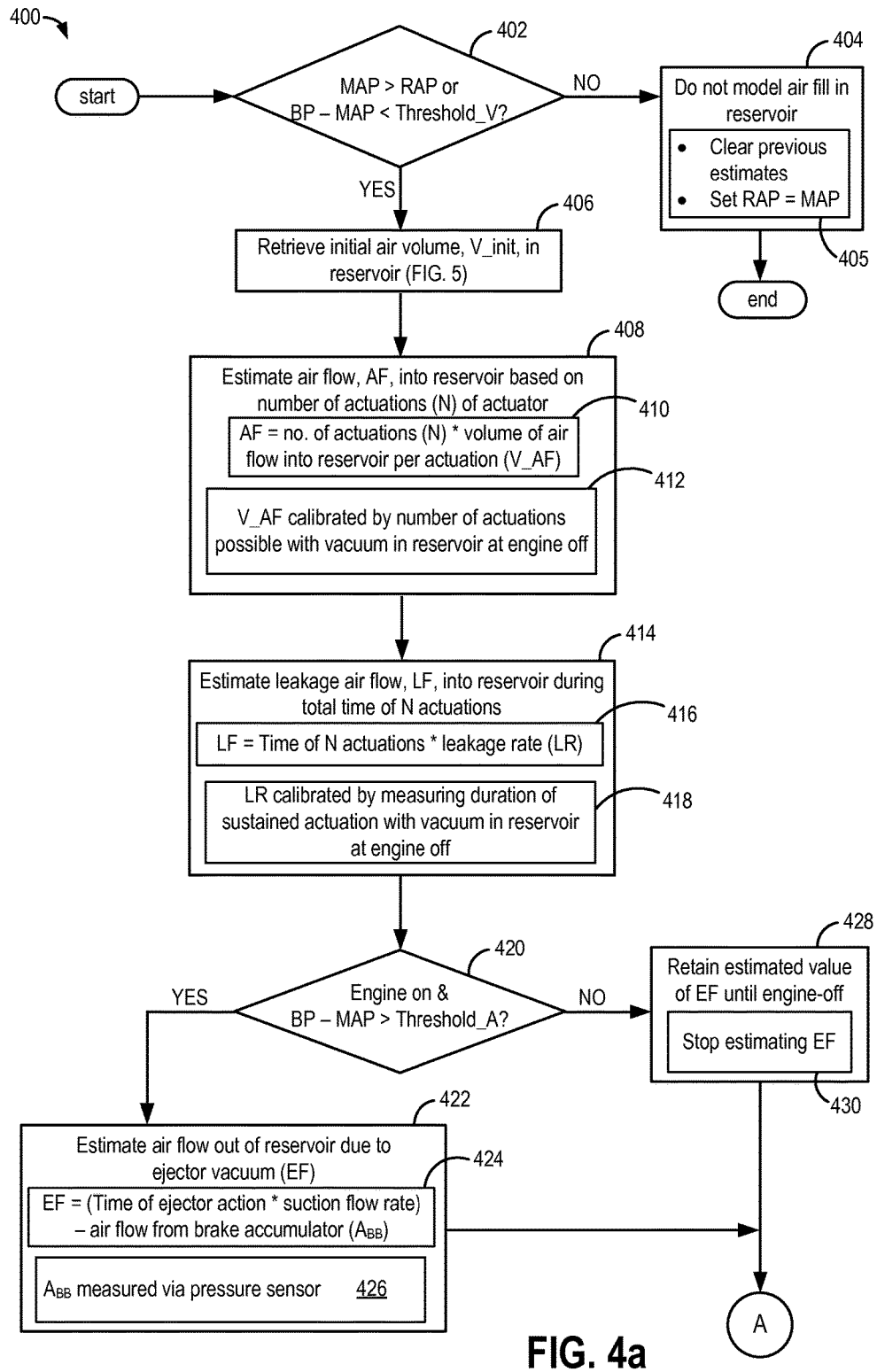
FIGS. 4a and 4b present an example flowchart for estimating a volume of air fill, and corresponding vacuum, in a vacuum reservoir in the engine, according to the present disclosure.
Figure 4B:
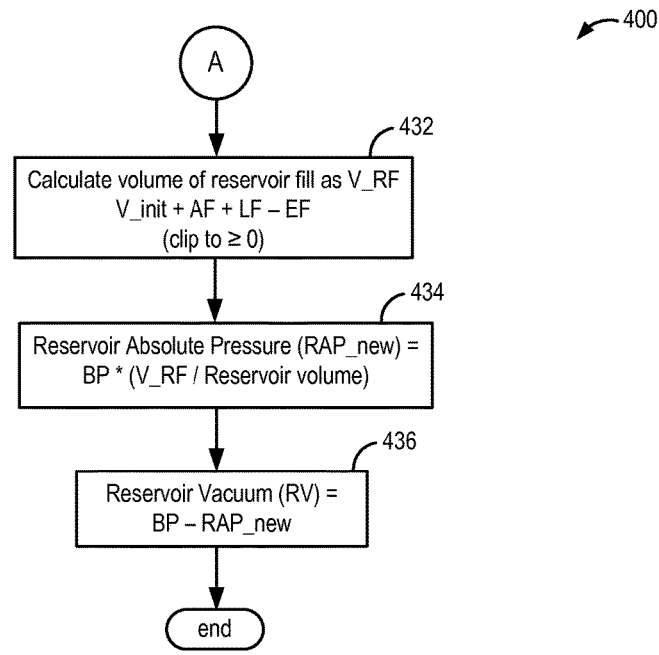
Figure 5:
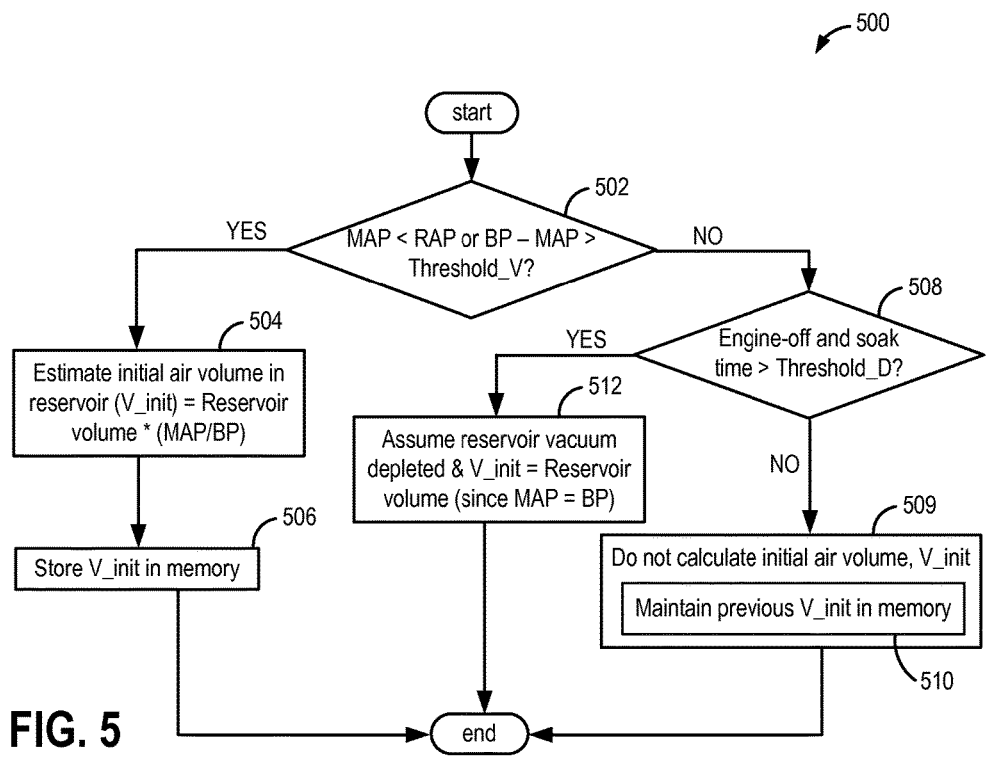
FIG. 5 shows an example flowchart illustrating an estimation of an initial volume of air in the vacuum reservoir.

However, an actuation command may not result in a corresponding change in valve position if sufficient vacuum is not available in the vacuum reservoir to actuate the valve. An amount of vacuum fill in the vacuum reservoir may be modeled by estimating air flow into and out of the vacuum reservoir (FIGS. 4a, 4b, and 5). A diagnosis of the vacuum actuated valve may be based upon the estimated amount of vacuum fill in the vacuum reservoir (FIG. 3) such that the vacuum actuated valve is determined to be degraded only if the estimated amount of vacuum fill is higher than a threshold amount (FIG. 6) and actuation does not produce a change in position of the vacuum actuated valve. In this way, an unresponsive vacuum actuated valve may not be deemed as degraded if sufficient vacuum is not available for its actuation.

FIG. 1 shows a schematic depiction of an example engine system 100 including a multi-cylinder internal combustion engine 10. As one non-limiting example, engine system 100 can be included as part of a propulsion system for a passenger vehicle. Engine 10 may be controlled at least partially by a control system 14 including a controller 12 and by input from a vehicle operator 132 via an input device 130. In this example, input device 130 includes an accelerator pedal and a pedal position sensor 134 for generating a proportional pedal position signal PP.

Engine system 100 can receive intake air via intake passage 42. Intake passage 42 can include an air filter (not shown). Engine 10 may include a plurality of cylinders 30. In the depicted example, engine 10 includes six cylinders arranged in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 30 may be configured with a fuel injector 66. In the depicted example, fuel injector 66 is a direct in-cylinder injector. However, in other examples, fuel injector 66 can be configured as a port fuel injector.

Intake air supplied to each cylinder 30 (herein, also referred to as combustion chamber 30) via common intake manifold 44 may be used for fuel combustion and products of combustion may then be exhausted via bank-specific exhaust passages. In the depicted example, a first bank 13 of cylinders of engine 10 can exhaust products of combustion via a common first exhaust manifold 56 through a common exhaust passage 17 and a second bank 15 of cylinders can exhaust products of combustion via a common second exhaust manifold 48 through a common exhaust passage 19.

The intake passage 42 includes an intake throttle 62 having a throttle plate 64. In this particular example, the position of the throttle plate 64 may be varied by controller 12 via a signal provided to an electric motor or throttle actuator 67 included with the intake throttle 62, a configuration that is commonly referred to as electronic throttle control (ETC). The intake passage 42 may include a mass air flow sensor 120 and a barometric pressure sensor 121 for providing respective signals MAF and BP regarding air flow through the intake and barometric pressure respectively, to the controller 12. An aspirator 20 may be coupled in an aspirator passage 23 across intake throttle 62 as shown. When manifold pressure downstream of intake throttle 62 is lower than air pressure upstream of intake throttle 62, air may enter the aspirator passage 23 at first end 27, flow through aspirator 20, and enter intake manifold 44 at second end 29 of the aspirator passage 23. Air flowing through aspirator 20 may generate vacuum at the neck of aspirator 20 which may draw air from one or more of a vacuum reservoir 158, a brake accumulator, a brake booster, a fuel vapor canister (not shown), etc.

A number of charge motion control devices (CMCD) 80 may be positioned in the intake manifold 44, with each CMCD corresponding to one of cylinders 30. As seen in FIG. 1, intake manifold 44 splits into individual, discrete paths corresponding to individual cylinders 30. Inside each of the discrete paths a CMCD 80 may be placed to manipulate airflow into the corresponding cylinder. Thus, each of cylinders 30 may be fluidically coupled to a single CMCD 80. Other embodiments may include a single cylinder being fluidically coupled to multiple CMCDs 80 without departing from the scope of the present disclosure. In some embodiments, CMCDs 80 may include valves, such as shown in FIG. 1, in which case the devices may be equivalently referred to as charge motion control valves (CMCV) 80. CMCV 80 may also be referred to as swirl control valves or tumble control valves.

CMCVs 80 may restrict airflow to one or more of cylinders 30 for a variety of desired results, including but not limited to adjusting turbulence and burn rate. In the example of FIG. 1, each CMCV 80 may include a valve plate with a cut-out section. Other designs of the valve plate are possible. Note that for the purposes of this disclosure the CMCV is in the "closed" position when it is fully activated and the valve plate may be fully tilted into the respective conduit of intake manifold 44, thereby resulting in maximum air charge flow obstruction. Alternatively, the CMCV is in the "open" position when deactivated and the valve plate may be fully rotated to lie substantially parallel with airflow (as depicted in FIG. 1), thereby considerably minimizing or eliminating airflow charge obstruction. The CMCVs may principally be maintained in their "open" position and may only be activated "closed" when swirl conditions are desired. Each CMCV 80 may be adjusted via a rotating shaft to rotate the valve plate so that the valve plate is parallel to the flow direction when in the "open" position. In other embodiments, the valve (plate) of each CMCV 80 may be integrated into the branches of intake manifold 44 such that airflow restriction is caused by end-pivoting CMCV 80 into the airflow during the closed position. Other configurations of CMCV 80 are possible while remaining within the scope of the present disclosure.

As shown in FIG. 1, CMCVs 80 in the first bank 13 of cylinders of engine 10 may be rotated by rotating shaft 71 which may be actuated by actuator 77. Likewise, CMCVs 80 in the second bank 15 of cylinders of engine 10 may be rotated by rotating shaft 81 which may in turn be actuated by actuator 75. CMCV actuators 75 and 77 may be vacuum actuators and may be fluidically coupled to vacuum reservoir 158 via respective conduits. A supply of vacuum to CMCV actuators 75 and 77 may be provided via respective conduits 97 and 98 based on activation of respective valves 87 and 89. Vacuum may be obtained from vacuum reservoir 158, as shown in FIG. 1. Further, vacuum may also be received from the intake manifold 44 (not shown in FIG. 1) which may be substantially under vacuum conditions during engine operation e.g. when the intake throttle 62 is closed or mostly closed. In one example, valves 87 and 89 may be solenoid valves. A change in position of the rotating shafts 71 and 81 may be determined by respective position sensors 85 and 83 which may be coupled to their respective rotating shafts by one of several methods.

Engine system 100 may include a control system 14 which in turn comprises controller 12, which may be any electronic control system of the engine system or of the vehicle in which the engine system is installed. Controller 12 may be configured to make control decisions based at least partly on input from one or more sensors 16 within the engine system, and may control actuators 82 based on the control decisions. For example, controller 12 may store computer-readable instructions in memory, and actuators 82 may be controlled via execution of the instructions. Example sensors include MAP sensor 122, MAF sensor 120, BP sensor 121, position sensors 83 and 85, and manifold air temperature (MAT) sensor 123. Example actuators include throttle actuator 67, fuel injector 66, solenoid valves 87 and 89 that supply vacuum to CMCV actuators 75 and 77 respectively, to adjust CMCVs 80, etc. Additional sensors and actuators may be included, as described in FIG. 2.

Control system 14 with controller 12 may include computer-readable instructions for controlling actuators 82, in particular CMCV actuators 75 and 77. For example, actuation (i.e., opening and closing) of CMCVs 80 may be a function of engine speed and load, wherein load is a function of factors such as intake manifold pressure (MAP), atmospheric pressure, and temperature, among others. In other examples, actuation of CMCVs 80 may be responsive to actuation of intake throttle 62 and may be used within the control system to monitor engine load. Alternately, the control system 14 may have instructions to close and/or open CMCV(s) 80 in response to a function of both variables. Valve actuation may be further responsive to temperature, ignition timing, or other conditions not otherwise specified.

Referring now to FIG. 2, it portrays one cylinder 30 of multi-cylinder engine 10 of the embodiment of FIG. 1. Cylinder 30 in FIG. 2 may be one cylinder from second bank 15 of cylinders of engine 10 in FIG. 1. As such, components previously introduced in FIG. 1 are numbered similarly in FIG. 2 and not reintroduced.

Cylinder 30 (also termed combustion chamber 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

As described earlier in reference to FIG. 1, combustion chamber 30 may receive intake air from intake manifold 44 via intake passage 42 and may exhaust combustion gases via exhaust manifold 48 and exhaust passage 19. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 55 and 57, respectively. Thus, the position of an intake cam may be determined by position sensor 55. The position of an exhaust cam may be determined by position sensor 57.

In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems. While FIG. 2 depicts one cylinder 30 from second bank 15 of cylinders in engine 10 of FIG. 1, other cylinders 30 of each of first bank 13 and second bank 15 of engine 10 may similarly include intake/exhaust valves controlled by one of the above described valve actuation systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake manifold 44 is shown communicating with intake throttle 62 having a throttle plate 64. In this particular example, the position of throttle plate 64 may be varied by controller 12 via a signal provided to an electric motor or actuator (throttle actuator 67 not shown in FIG. 2) included with intake throttle 62, a configuration that is commonly referred to as electronic throttle control (ETC). Intake throttle 62 may control airflow from intake passage 42 to intake manifold 44 and combustion chamber 30 among other engine cylinders. The position of throttle plate 64 may be provided to controller 12 by throttle position signal TP from throttle position sensor 58.

Exhaust gas sensor 126 is shown coupled to exhaust passage 19 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 19 downstream of exhaust gas sensor 126. Device 70 may be a three way catalyst (TWC), NOx trap, various other emission control devices, or combinations thereof.

As described in reference to FIG. 1, CMCV 80 is located in intake manifold 44 in a conduit leading to intake valve 52 of cylinder 30. A position of CMCV 80 may be adjusted by rotating a shaft, such as rotating shaft 81 of FIG. 1, using CMCV actuator 75. The change in position (or lack, thereof) of the rotating shaft and therefore, of CMCVs 80, may be communicated via position sensor 83 to controller 12. When a change in position of the CMCV is desired, controller 12 may activate solenoid valve 87 to supply vacuum to actuate CMCV actuator 75. Vacuum may be provided to CMCV actuator 75 from vacuum reservoir 158. Vacuum reservoir 158 may provide vacuum exclusively to CMCV actuators as depicted in FIG. 1. It will be noted that while the depicted schematic examples of FIGS. 1 and 2 show vacuum reservoir 158 as located outside of intake manifold 44, vacuum reservoir 158 may be positioned within intake manifold 44. However, piping between the intake manifold and the vacuum reservoir may be externally situated. Vacuum may be drawn from vacuum reservoir 158 only under conditions when manifold vacuum (vacuum in intake manifold 44) is not adequate for actuation of different vacuum actuators e.g. CMCV actuator 75. Accordingly, solenoid valve 87 may be fluidically coupled via passage 99 and passage 95 to intake manifold 44. As such, vacuum levels in vacuum reservoir 158 may be replenished via passage 95 from the intake manifold 44 (which will be described later) during engine conditions with increased intake manifold vacuum. Aspirator 20 may be coupled in passage 23 across from intake throttle 62 such that a portion of air from upstream of intake throttle 62 may flow into first end 27 of passage 23, through aspirator 20, and may exit into intake manifold 44 downstream of intake throttle 62. Air flow through aspirator 20 creates a low pressure region within the aspirator 20, thereby providing a vacuum source for vacuum reservoirs and vacuum consumption devices such as fuel vapor canisters, brake boosters, etc. Aspirators (which may alternatively be referred to as ejectors, venturis, jet pumps, and eductors) are therefore, passive devices which can provide low-cost vacuum generation when utilized in engine systems.

Continuing with FIG. 2, vacuum reservoir 158 may be supplied vacuum from intake manifold 44 via passage 95. A check valve 60 is included in passage 95 to allow a flow of air from vacuum reservoir 158 to intake manifold 44 and inhibit flow of air from intake manifold 44 to vacuum reservoir 158. Air may be drawn from vacuum reservoir 158 when manifold vacuum is higher than an amount of vacuum fill in vacuum reservoir 158. In other words, when manifold absolute pressure in intake manifold 44 is lower than absolute pressure in the vacuum reservoir, air will flow from vacuum reservoir into the intake manifold. Herein, the amount of vacuum fill in vacuum reservoir 158 will increase while simultaneously an amount of air fill in the vacuum reservoir 158 will decrease. It will be appreciated that a higher vacuum indicates a lower absolute pressure.

Additionally, vacuum reservoir 158 may be supplied vacuum from ejector 20 via passages 91 and 73. Check valve 61 in passage 91 may allow a flow of air from vacuum reservoir 158 towards aspirator 20 and may impede flow of air from the aspirator 20 to the vacuum reservoir 158. Further, ejector 20 may also supply vacuum to brake vacuum reservoir 138 which in the depicted example communicates fluidically via passage 94 with brake booster 140. Brake vacuum reservoir 138 may also be termed a brake accumulator. Brake vacuum reservoir 138 may receive vacuum from aspirator 20 via passages 73 and 93. Check valve 63 in passage 93 ensures air flows only from brake vacuum reservoir 138 to aspirator 20 and that air does not flow from ejector 20 to brake vacuum reservoir 138. Likewise, check valve 65 in passage 94 ensures air flows only from brake booster 140 to brake vacuum reservoir 138, and does not pass from brake vacuum reservoir 138 to brake booster 140. Brake booster 140 may also be provided vacuum directly from intake manifold 44 (not shown). Brake booster 140 may include an internal vacuum reservoir, and it may amplify force provided by vehicle operator 132 via brake pedal 150 to master cylinder for applying vehicle brakes (not shown). Thus, it will be noted that ejector 20 may provide vacuum to each of brake vacuum reservoir 138 and vacuum reservoir 158. Further, vacuum reservoir 158 (and brake vacuum reservoir 138) may store lower pressure than manifold pressure. As such, vacuum generated by aspirator 20 may be preferentially provided to brake vacuum reservoir 138 since it supplies vacuum to the brake booster 140. For example, check valve 63 may include a larger orifice relative to that included in check valve 61 to enable a larger proportion of aspirator generated vacuum to be supplied to brake vacuum reservoir 138. It will also be noted that vacuum reservoir 158 may not be coupled to a pressure sensor. Accordingly, in order to learn an amount of vacuum fill level in the vacuum reservoir 158, an estimation model may be desired to determine the amount of vacuum fill level that will be further described in reference to FIGS. 3-5.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, CMCV actuator 75 via solenoid valve 87, fuel injector 66 and the like. Controller 12 is shown receiving various signals from sensors coupled to engine 10, in addition to those signals previously discussed, including: engine coolant temperature (ECT) from temperature sensor 112 coupled to cooling sleeve 114; position sensor 134 coupled to an accelerator pedal 130 for sensing accelerator position adjusted by vehicle operator 132; a measurement of engine manifold pressure (MAP) from pressure sensor 122 coupled to intake manifold 44; a measurement of barometric pressure (BP) from pressure sensor 121 coupled to intake passage 42; a measurement of vacuum in brake vacuum reservoir 138 from pressure sensor 125, a profile ignition pickup signal (PIP) from Hall effect sensor 118 (or other type) coupled to crankshaft 40; a measurement of air mass entering the engine from mass airflow sensor 120; position sensor 83 coupled to rotating shafts 81; and a measurement of throttle position from sensor 58. Engine position sensor 118 may produce a predetermined number of equally spaced pulses every revolution of the crankshaft from which engine speed (RPM) can be determined. Storage medium read-only memory 106 in controller 12 can be programmed with computer readable data representing instructions executable by processor 102 for performing the methods described below, as well as other variants that are anticipated but not specifically listed. Example methods and routines are described herein with reference to FIGS. 3-5.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

It will be appreciated that though a single cylinder 30 is depicted in FIG. 2, each cylinder 30 in engine 10 may have its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

Thus, an example system may include an engine with a cylinder, the cylinder fluidically communicating with an intake passage via an intake manifold, a charge motion control valve positioned in the intake passage downstream of an intake throttle, an actuator that actuates the charge motion control valve between an open position and a closed position, a vacuum reservoir fluidically communicating with each of the actuator, an aspirator, and the intake manifold, and a controller with computer-readable instructions stored in non-transitory memory for actuating the charge motion control valve via the actuator.

Figure 3:
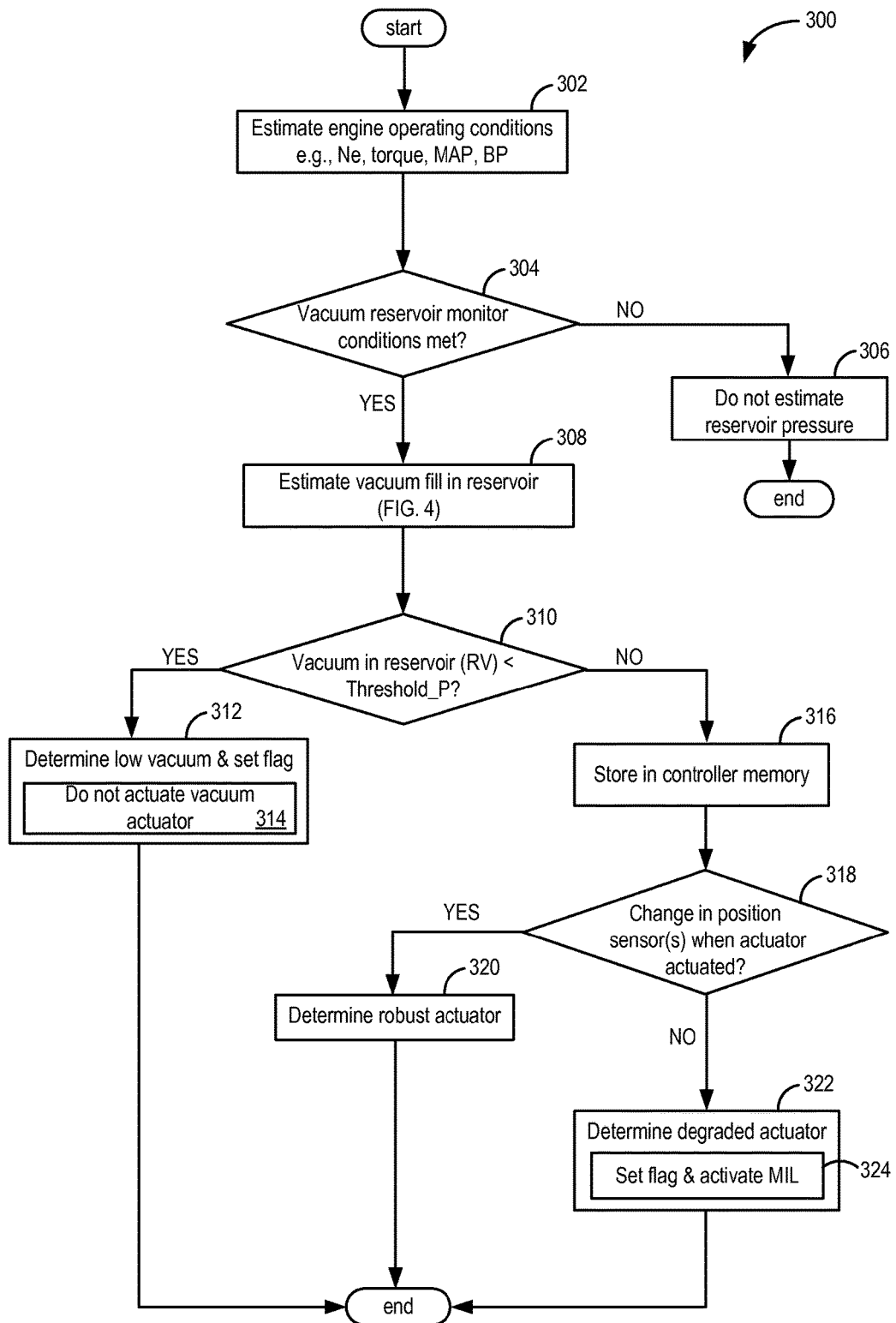
FIG. 3 depicts an example flowchart for diagnosing degradation in a vacuum actuator in the engine of FIG. 1, in accordance with the present disclosure.

Turning now to FIG. 3, it shows an example routine 300 for diagnosing degradation in a vacuum actuated valve or a vacuum actuator, such as a CMCV or the CMCV actuator. Specifically, indication of degradation in the CMCV actuator and/or CMCV is based upon an estimation of an amount of vacuum fill level in a vacuum reservoir that supplies vacuum to the CMCV actuator, such as vacuum reservoir 158 of FIGS. 1 and 2. Vacuum reservoir 158 may also be termed an intake manifold runner control reservoir, and the CMCVs may also be termed intake manifold runner control valves.

At 302, engine operating conditions may be determined. Engine operating conditions may include engine speed (Ne), torque demand, combustion air-fuel ratio, barometric pressure (BP), manifold absolute pressure (MAP), etc. At 304, routine 300 may determine if conditions to estimate the amount of vacuum fill level in the vacuum reservoir are met. For example, estimation the amount of vacuum fill in the vacuum reservoir may not be implemented when manifold vacuum is sufficient to actuate the CMCV actuators. Thus, estimation of vacuum fill in the vacuum reservoir may be performed when manifold vacuum is not sufficient to actuate the CMCV actuators, and when vacuum to actuate the CMCV actuators is being supplied by the vacuum reservoir.

If vacuum fill estimating conditions are not met, routine 300 continues to 306 to not perform an estimation of reservoir vacuum, and ends. On the other hand, if vacuum fill estimation conditions are met, routine 300 proceeds to 308 to estimate the amount of vacuum fill level (in other words, pressure) in the vacuum reservoir. Routine 400 of FIG. 4 will provide further details regarding the estimation.

Next, at 310, routine 300 may determine if the estimated amount of vacuum fill level in the reservoir, RV, (also termed reservoir vacuum) is less than a first threshold, Threshold_P. For example, the first threshold may be a vacuum of 7 inches of mercury. In another example, Threshold_P may be a vacuum of 6 inches of mercury. If it is determined at 310 that the amount of vacuum fill level in the vacuum reservoir is less than Threshold_P, routine 300 continues to 312 to indicate a low level of vacuum and to set a flag in the control system. As such, the amount of vacuum fill in the vacuum reservoir may be increased at the next available opportunity. For example, if manifold vacuum is not sufficiently high to supply vacuum to the vacuum reservoir, and when engine conditions permit, the intake throttle may be adjusted to a more closed position to increase manifold vacuum. The adjustment to the intake throttle may be accompanied by a corresponding rise in engine speed to maintain engine power at a relatively constant level. As such, this method may be more suitable for vehicles equipped with continuously variable transmission. In another example, air flow through the aspirator may be increased such that vacuum may be provided by the aspirator. Further, at 314, routine 300 may also set a flag to not actuate the vacuum actuator. In the example of CMCV actuators and CMCVs, the CMCV actuators may not be actuated so that the CMCVs may be maintained in their open position and not be actuated to a closed position.

If, at 310, it is determined that the amount of vacuum fill in the vacuum reservoir is greater than the first threshold, Threshold_P, routine 300 proceeds to 316 to store the estimated amount of vacuum fill reading in the controller. Further, when this estimation is followed by a subsequent actuation of the vacuum actuator (e.g. CMCV actuator), routine 300 may confirm at 318 that a corresponding position sensor indicates a change in position of the vacuum actuated valve, e.g. CMCV(s). If yes, routine 300 progresses to 320 to determine a robust actuator and/or a robust vacuum actuated valve. On the other hand, if the position sensor(s) does not indicate a change in position of the vacuum actuated valve (e.g. CMCV(s)) upon actuation of the vacuum actuators, e.g. CMCV actuators, at 322, routine 300 may determine that the actuator (or other related hardware) is degraded. Further, at 324, a flag may be set including a diagnostic code and a malfunction indicator lamp (MIL) may be lit.

Thus, the example engine system described earlier may include a controller with computer-readable instructions stored in non-transitory memory for actuating the charge motion control valve via the actuator, e.g. CMCV actuator, and indicating degradation of the actuator if the charge motion control valve remains motionless in response to the actuating when an amount of air fill in the vacuum reservoir is lower than a threshold. The amount of air fill in the vacuum reservoir is related to the amount of vacuum fill in the vacuum reservoir. Thus, degradation of the actuator may be indicated if the charge motion control valve remains motionless in response to the actuating when the amount of vacuum fill in the vacuum reservoir is higher than a threshold, such as first threshold, Threshold_P. The controller may further comprise instructions for disabling the actuator and the charge motion control valve upon indication of degradation. The controller may include further instructions for indicating low vacuum in the vacuum reservoir when the amount of air fill in the vacuum reservoir is estimated to be higher than the threshold (or when the amount of vacuum fill is lower than the first threshold, Threshold_P).

In this manner, by learning the amount of vacuum fill level in the reservoir, a more reliable determination of degradation in a vacuum actuator may be made. As such, upon actuation, an absence of a corresponding change in position of the CMCV(s) or other vacuum actuated components may be due to insufficient vacuum in the reservoir. The above method, therefore, does not rely on simply a lack of responsiveness from the vacuum actuator to determine degradation.

Turning now to FIGS. 4a and 4b, they show routine 400 illustrating a method for determining an amount of (or a volume of) vacuum fill level in the vacuum reservoir. As such, the routine estimates an amount of air fill in the reservoir and calculates the amount of vacuum fill from the amount of air fill. Specifically, flow of air into and out of the vacuum reservoir is estimated based upon flow of air generated via each of an aspirator in the intake system, an actuation of a vacuum actuator, and leakage during the actuation of the vacuum actuator. Further, air fill in the vacuum reservoir may be used to determine a reservoir absolute pressure and then, a reservoir vacuum. It will be appreciated that the described calculation of determining vacuum utilizes volume of air flow instead of mass of air flow for ease of calculations. Mass flow calculations may be used without departing from the scope of this disclosure.

At 402, routine 400 may determine if manifold absolute pressure (MAP) is higher than a previously estimated reservoir absolute pressure (RAP). For example, RAP may be the most recent estimation that may be stored in the memory of the controller. As described earlier in reference to 304 of routine 300, MAP being higher than RAP may indicate that manifold vacuum is not adequate to actuate vacuum actuators in the engine system. Further, during conditions when the pressure in the intake manifold (MAP) is not sufficiently low, vacuum to actuate the CMCV actuators may be supplied by the vacuum reservoir, such as vacuum reservoir 158.

In another example, an entry condition to activate routine 400 may be confirming that manifold vacuum, as estimated by a difference between barometric pressure (BP) and MAP (as in, BP−MAP), is lower than a second threshold, Threshold_V. A lower manifold vacuum may indicate a higher absolute pressure in the manifold. In other words, a lower level of vacuum includes a smaller amount (or volume) of vacuum fill. Further, a higher vacuum in the intake manifold indicates a lower pressure (absolute) in the intake manifold. Further still, a higher vacuum indicates a higher level of vacuum fill. Thus, when manifold vacuum (e.g. BP−MAP) is lower than the second threshold, Threshold_V, manifold vacuum may not be sufficient to actuate the vacuum actuators such as CMCV actuators. In one example, Threshold_V may be 7 inches of mercury. In another example, Threshold_V may be 5 inches of mercury. As an example, MAP may be higher than RAP (or manifold vacuum may be lower than Threshold_V) during high acceleration conditions when the intake throttle (such as intake throttle 62 of engine 10) is in a wide open position. In another example, manifold pressure may rise at lower engine speeds with a mostly open intake throttle and thus, manifold vacuum may not be adequate to actuate vacuum actuators.

If, at 402, it is confirmed that MAP is not higher than the previously estimated RAP (or that BP−MAP is not lower than Threshold_V), routine 400 continues to 404 to not estimate or model the amount (or volume) of air fill in the vacuum reservoir. Further, at 405, routine 400 may clear previous estimates of flow of air into the vacuum reservoir due to actuations of the vacuum actuator including air flow due to leakage, from the controller memory. Further still, routine 400 sets RAP equal to the measured MAP, and then ends. As such, since MAP is not higher than the previously estimated RAP, vacuum may be supplied from the intake manifold to the vacuum reservoir resulting in a change in the volume of vacuum fill in the vacuum reservoir. Therefore, the RAP may be updated at 405 to be equal to MAP.

If it is determined at 402 that MAP is greater than the previously estimated RAP (or that BP−MAP is lower than Threshold_V), routine 400 proceeds to 406 to retrieve an initial air fill volume in the vacuum reservoir (V_init) from memory. Routine 500 of FIG. 5 may be used to determine an initial volume of air in the vacuum reservoir. The initial air volume in the vacuum reservoir may be a normalized volume. By normalizing air volume, the method described below for determining vacuum in the vacuum reservoir may compensate for altitude. As such, vehicle altitude may affect manifold pressure and reservoir vacuum.

Next, at 408, an amount of air flow into the reservoir may be estimated based on a number of successive actuations (N) of the vacuum actuator when MAP is lower than RAP (or when manifold vacuum is lower than Threshold_V). For example, when manifold vacuum is not sufficient to provide vacuum to the vacuum actuator, such as CMCV actuators 75 and 77 of engine 10, vacuum reservoir 158 may supply vacuum to the vacuum actuators. Each actuation of the vacuum actuator may increase air fill in the vacuum reservoir, and simultaneously reduce vacuum fill in the vacuum reservoir. By counting the number of actuations (N) that deplete vacuum from the vacuum reservoir, total volume of air flow (AF) introduced into the reservoir with N actuations may be calculated. Specifically, total volume of air flow, AF, into the vacuum reservoir with N actuations of the vacuum actuator may be calculated by multiplying N by a volume of air flow into the vacuum reservoir per actuation of the vacuum actuator (V_AF) as shown at 410.

A priori knowledge of the volume of air flow into the vacuum reservoir with each actuation of the vacuum actuator, V_AF, may be calibrated on-bench. When on-bench, the engine may be shut down after confirming that the vacuum reservoir contains a certain vacuum fill. The certain vacuum fill may be such that a given number of actuations of the vacuum actuator are possible. As such, confirmation that the vacuum reservoir is under vacuum may be performed by using a pressure sensor coupled to the vacuum reservoir when on-bench. The pressure sensor may indicate the pressure in the vacuum reservoir at the start of the calibration. Further, the engine may be at rest when shut down and the vehicle may be in an engine-off condition. After engine-off, the vacuum actuator (e.g. CMCV actuator) may be actuated successively (and counted) until there is no change in the position sensor output, indicating that actuation does not produce a change in the vacuum actuated valve. Next, existing pressure in the vacuum reservoir following the successive actuations (e.g. S number of actuations) may be determined via the pressure sensor coupled to the vacuum reservoir. During engine-off, manifold vacuum may not be present, and actuation of the vacuum actuator may draw vacuum only from the vacuum reservoir. Specifically, actuation of the CMCV actuators to change the position of CMCVs may utilize vacuum only from vacuum reservoir 158 of FIGS. 1 and 2. Thus, the volume of air flow per actuation may be calibrated by observing the number of actuations possible (e.g. S) with engine-off that deplete the vacuum in the vacuum reservoir. Herein, the change in pressure in the vacuum reservoir after the successive actuations may be divided by the counted number of actuations, e.g. S, to estimate V_AF at 412. Therefore, total volume of air flow, AF, may be calculated as follows:

$$AF = N \text{ actuations} * V\_AF \quad (1)$$

After determining total volume of air flow, AF, into the vacuum reservoir, routine 400 continues to 414 to estimate a leakage volume of air. During activation of the CMCV actuator, additional air flow may leak into the vacuum reservoir. To elaborate, during an actuation of the CMCV actuator, vacuum may flow from vacuum reservoir 158 to vacuum actuator 75 through passage 97. As such, air may be drawn into the vacuum reservoir during the actuations. Passage 97 (and similar passages) may be fashioned from hoses or similar conduits and vacuum may fill these hoses. Further, vacuum may fill space adjacent to a diaphragm in the CMCV actuator. As such, couplings and joints between the passages (or hoses) and actuators, and passages and the vacuum reservoir may include small leaks. Since the passages are filled with vacuum only during actuation of the vacuum actuator, the leakage rate may only be modeled during actuation of vacuum actuated valves.

Leakage air flow (LF) into the vacuum reservoir may be based on a total duration of N actuations and a pre-determined leakage rate (LR) as shown at 416. To elaborate, an accumulated time of activation of the vacuum actuator during the N actuations may be tracked to determine the total duration of N actuations. Further, leakage rate, LR, may be learned a priori on-bench similar to the calibration of V_AF. The engine may be shut down and at rest in an engine-off condition after confirming that vacuum is present in the vacuum reservoir. Further, the pressure in the vacuum reservoir may be learned before the calibration by the pressure sensor coupled to the vacuum reservoir. Next, a sustained actuation of the vacuum actuator may be performed, at 418, and a duration of the actuation may be measured until vacuum in the vacuum reservoir is drained. The pressure sensor may sense an existing pressure in the vacuum reservoir at the end of the calibration and a change in pressure in the vacuum reservoir from beginning of calibration until the end may be estimated. Leakage rate, LR, may be estimated by dividing the vacuum reservoir pressure change by duration of the sustained actuation to deplete the reservoir. Thus, leakage air flow (LF) into the vacuum reservoir during N actuations may be determined by multiplying the accumulated time of N actuations and leakage rate (LR).

$$LF = \text{accumulated time of } N \text{ actuations} * LR \quad (2)$$

Next, an outflow of air from the reservoir towards an aspirator, such as aspirator 20 of engine 10, may be calculated. At 420, it may be first confirmed if the engine is ON and manifold vacuum is greater than a third threshold, Threshold_A. As mentioned earlier, manifold vacuum may be determined as a difference between barometric pressure and manifold absolute pressure (e.g. BP−MAP). The aspirator coupled across the intake throttle may generate a vacuum based on an existing air flow in the intake passage. Further, air flow in the intake passage of the engine may occur when the engine is ON and intake manifold is at a lower pressure than atmospheric pressure (as measured by BP). Further still, the aspirator may generate sufficient vacuum only when the difference between manifold pressure and atmospheric pressure is at least Threshold_A. In one example, Threshold_A may be 3 inches of mercury. In another example, Threshold_A may be 4 inches of mercury. If, at 420, it is confirmed that the engine is ON and BP−MAP is higher than the third threshold, Threshold_A, routine 400 continues to 422 to estimate an air flow (EF) out of the vacuum reservoir towards the ejector. To elaborate, vacuum generated by the aspirator may draw air from the vacuum reservoir into the aspirator, and thereon into the intake passage. Thus, vacuum fill level in the vacuum reservoir may be increased due to aspirator vacuum.

Air flow out of the vacuum reservoir due to ejector vacuum, EF, may be calculated based on a duration that the aspirator supplies vacuum to the vacuum reservoir for the CMCV, such as vacuum reservoir 158, a suction flow rate of the aspirator, and air flow out of the brake accumulator or brake vacuum reservoir that supplies the brake booster, such as brake vacuum reservoir 138 coupled to engine 10. At 424, EF may be calculated by subtracting air flow from the brake vacuum reservoir that supplies the brake booster (brake accumulator) $A_{BB}$ from a product of the duration that the aspirator supplies vacuum and the suction flow rate (SFR) of the aspirator.

$$EF = (\text{duration of ejector action} * SFR) - A_{BB} \quad (3)$$

Since aspirator 20 in the engine embodiment of FIG. 2 provides vacuum to each of vacuum reservoir 158 and brake vacuum reservoir 138, vacuum generated at aspirator 20 may be shared by both reservoirs. Thus, in the duration that the aspirator supplies vacuum, air drawn from brake vacuum reservoir 138 (or vacuum supplied to brake vacuum reservoir 138) may not be included, and therefore, subtracted, in the estimation of air fill in vacuum reservoir 158 that supplies vacuum to CMCV actuators. Air flow from brake vacuum reservoir 138 (or brake accumulator) may be measured at 426 by a pressure sensor, such as pressure sensor 125 in FIG. 2, coupled to brake vacuum reservoir 138. Routine 400 then proceeds to 432.

Returning now to 420, if routine 400 determines that the engine is not ON and that manifold vacuum (as determined by BP−MAP) is lower than Threshold_A, the aspirator may not be generating sufficient vacuum. In one example, the engine may be in an engine-off condition with the engine shut down and at rest. If manifold vacuum is lower than Threshold_A, adequate air flow may not be present in the intake, and thereby, no or low vacuum may be generated by the aspirator. However, any vacuum generated by the ejector and supplied to the vacuum reservoir 158, EF, (as estimated at 424 by equation 3) before engine-off, or before manifold vacuum level decreased below Threshold_A, may be retained in the memory of the controller at 428, and further estimation of EF may be stopped at 430. Routine 400 then continues to 432.

Next, at 432, the total volume of air fill in the vacuum reservoir, V_RF, is calculated by combining initial air fill, V_init, air flow into vacuum reservoir due to successive N actuations, AF, leakage air flow into the vacuum reservoir during the N actuations, LF, and by subtracting air flow out of the vacuum reservoir due to ejector vacuum, EF. Thus, $$V\_RF = (V\_init + AF + LF) - EF \quad (4)$$

Herein, EF may be a value retained in the memory of the controller at 428. V_RF, if determined to be less than zero, may be clipped to be equal to zero, since zero volume of air fill may indicate a perfect vacuum.

At 434, reservoir absolute pressure (RAP) may be determined as follows:

$$RAP\_new = BP * (V\_RF / \text{Reservoir volume}) \quad (5)$$

Reservoir volume may be the actual volume of the entire vacuum reservoir, such as vacuum reservoir 158 of FIGS. 1 and 2. RAP_new may replace the previously estimated RAP in the memory of the control system. Further, vacuum in the vacuum reservoir (RV) may be estimated by subtracting RAP_new from BP, at 436.

$$RV = BP - RAP\_new \quad (6)$$

RV may indicate the amount of vacuum fill in the vacuum reservoir.

It will be appreciated that estimation of reservoir vacuum may be terminated when manifold vacuum increases above Threshold_V. Alternatively, the calculation of reservoir vacuum may be terminated when manifold pressure reduces below a previous estimation of reservoir pressure (e.g. MAP<RAP). To elaborate, when manifold vacuum (BP−MAP) is sufficient to supply vacuum to, and actuate, the vacuum actuators, manifold vacuum may be higher than reservoir vacuum. Therefore, the intake manifold may provide vacuum to the vacuum reservoir and may affect calculations of the RAP. Accordingly, when it is determined that manifold vacuum (BP−MAP) is higher than Threshold_V, RAP calculations may be aborted and cleared in the memory of the controller. Further, a previously determined RAP may also be cleared from the memory and an initial air fill may be determined as will be explained in reference to routine 500 of FIG. 5 below.

In this way, vacuum in a vacuum reservoir may be modeled by estimating an amount or volume of air flowing into and out of the vacuum reservoir due to one or more actuations of the vacuum actuator, leakage flow, and/or aspirator vacuum. An initial, existing volume of air may be determined first, as will be detailed in FIG. 5, and air flow into the vacuum reservoir due to actuation(s) of the vacuum actuator and corresponding leakage flow (if present) may be added. Further, if aspirator vacuum is provided to the vacuum reservoir during the estimation, the quantity of air flow out of the vacuum reservoir may be subtracted. The quantity (or volume) of outflow of air from the vacuum reservoir due to aspirator vacuum may be based on vacuum supplied to other devices such as brake accumulator or brake vacuum reservoir 138 of FIG. 2. The air fill in the vacuum reservoir may then be converted to an absolute pressure, which may then be converted to a vacuum in the reservoir (RV). As such, this may be termed vacuum fill in the reservoir. Further, as described in FIG. 3, the estimated reservoir vacuum may be compared to a desired first threshold (Threshold_P). If the estimated reservoir vacuum is lower than the desired first threshold, the controller may set a flag to replenish vacuum in the vacuum reservoir when an opportunity is determined. If reservoir vacuum is determined to be higher than the desired first threshold, and a subsequent actuation of the vacuum actuator does not produce a change in position of the actuated valve (e.g. CMCV), degradation in the vacuum actuator (and/or vacuum actuated valve) may be determined.

Thus, an example method may comprise indicating degradation of a vacuum actuator based on an estimate of flow of air into and out of a vacuum reservoir, the estimate based on flow of air generated via each of an aspirator in the intake system, an actuation of the vacuum actuator, and leakage during the actuation of the vacuum actuator. Degradation of the vacuum actuator may be indicated when vacuum fill in the vacuum reservoir based on the estimate of flow of air is higher than a first threshold (e.g. Threshold_P) and when a position of the vacuum actuator does not change when actuated. Further, the method may include not indicating degradation of the vacuum actuator when vacuum fill in the vacuum reservoir based on the estimate of flow of air is lower than the first threshold (e.g. Threshold_P) and when the position of the vacuum actuator does not change when actuated. The vacuum reservoir may be an intake manifold runner control reservoir, such as vacuum reservoir 158 of FIGS. 1 and 2, which supplies vacuum only to the charge motion control valve (CMCV) actuators. Further, the vacuum actuator may actuate a CMCV. The aspirator coupled in an engine system may draw air from the vacuum reservoir, the actuation of the vacuum actuator may flow air into the vacuum reservoir, and leakage during the actuation of the vacuum actuator may introduce air into the vacuum reservoir. The flow of air via the actuation of the vacuum actuator may be based on a calibrated value, the calibrated value being a first portion of air flowing into the vacuum reservoir per actuation of the vacuum actuator. The flow of air via leakage during the actuation of the vacuum actuator may be based on a leakage rate, the leakage rate determined by calculating a second portion of air flowing into the vacuum reservoir over a given duration during sustained actuation of the vacuum actuator. The flow of air via the aspirator may be a function of each of manifold vacuum (which may determine air flow rate in the engine intake passage) and vacuum consumed by one or more vacuum consumption devices other than the vacuum actuator. The vacuum consumption devices may include one or more of a reservoir supplying a brake booster such as a brake accumulator, the brake booster, and a fuel vapor canister. Turning now to FIG. 5, it depicts routine 500 illustrating the estimation of an initial normalized air volume in the vacuum reservoir. The initial air fill volume is estimated prior to calculating changes in air fill in the vacuum reservoir. As explained earlier, the volume is normalized to accommodate for vehicle altitudes.

At 502, routine 500 determines if pressure in the intake manifold (MAP) is lower than a previously estimated RAP. Alternatively, initial air volume in the vacuum reservoir may be determined when manifold vacuum (e.g. BP−MAP) is higher than the second threshold, Threshold_V introduced in routine 400. An initial air fill volume of the vacuum reservoir may be determined when manifold vacuum is sufficient to supply vacuum to the vacuum reservoir. When BP−MAP is greater than Threshold_V and/or when MAP is less than the previously estimated RAP, air will flow from the vacuum reservoir to the intake manifold and a level of vacuum fill in the vacuum reservoir may increase. As mentioned earlier, Threshold_V may, in one example, be 7 inches of mercury. In another example, Threshold_V may be 5 inches of mercury. As such, when MAP is lower than RAP and/or when manifold vacuum is higher than Threshold_V, the controller may re-initialize the calculation of initial air fill in the vacuum reservoir to determine a current air fill level.

If it is determined that MAP is lower than RAP and/or manifold vacuum is higher than Threshold_V, routine 500 proceeds to 504 to estimate the initial normalized air volume in the vacuum reservoir (V_init) as follows: Reservoir volume*(MAP/BP). This estimated initial air volume may be stored in the memory of the controller, at 506, for retrieval when a reservoir vacuum calculation (e.g. routine 400) is activated.

If, at 502, it is determined that MAP is not lower than the previously estimated RAP and/or manifold vacuum is lower than Threshold_V, routine 500 continues to 508. In one example, MAP may be higher than the previously estimated RAP during high acceleration conditions when the intake throttle is wide open. In another example, MAP may be higher than the previously estimated RAP (or manifold vacuum may be lower than Threshold_V) if the engine is shut down and at rest in the engine-off condition. Herein, MAP may be equal to atmospheric (or barometric) pressure. Accordingly, at 508, routine 500 determines if the engine is in an engine-off condition and if the duration of engine soak is more than Threshold_D. If the engine is shut down and at rest in the engine-off condition (also termed, engine soak) for a duration longer than Threshold_D, reservoir vacuum may be depleted. As an example, reservoir vacuum may be depleted due to leakage. On the other hand, a shorter duration of engine soak may retain a portion of vacuum fill in the vacuum reservoir. In one example, Threshold_D may be 3 days. In another example, Threshold_D may be shorter, e.g. 2 days. Alternatively, Threshold_D may be longer than 3 days.

If, at 508, routine 500 determines that the engine has been in the engine-off condition and the engine soak time is shorter than Threshold_D, routine 500 proceeds to 509 where a new initial air volume may not be calculated and at 510, a previously estimated initial air volume may be retained in the memory of the controller. Routine 500 may then end. On the other hand, if it is determined that the engine has been in the engine-off condition and the engine soak time is greater than Threshold_D, routine 500 continues to 512. At 512, reservoir vacuum is estimated to be depleted and V_init may be determined to be equal to reservoir volume. To elaborate, if duration of engine soak is longer than Threshold_D, MAP may be equal to BP. Therefore, calculating V_init according to the equation used in 504 (V_init=Reservoir volume*(MAP/BP)) results in V_init being equal to reservoir volume. Routine 500 then ends.

Thus, in one representation, a method for estimating air fill in a vacuum reservoir, may comprise determining an initial volume of air in the vacuum reservoir, adding a first volume of air based on a number of successive actuations by a vacuum activated actuator, adding a second volume of air based on leakage during the number of successive actuations, subtracting a third volume of air based on withdrawal of air from the vacuum reservoir by an aspirator, and indicating degradation of the vacuum activated actuator when the estimated air fill is lower than a threshold and a position of the vacuum activated actuator does not change when actuated. The initial volume of air in the vacuum reservoir may be determined when manifold absolute pressure is lower than a previously estimated absolute pressure in the vacuum reservoir. In another example, the initial volume of air in the vacuum reservoir may be determined when manifold vacuum is higher than a second threshold, such as Threshold_V. Further, the adding and subtracting may be performed only when manifold vacuum is smaller (lower) than the second threshold Threshold_V. In other words, the initial air volume in the vacuum reservoir may be determined only when the intake manifold can supply vacuum to the vacuum actuator(s) and vacuum reservoir, and reservoir vacuum may be estimated only when the intake manifold cannot supply vacuum to the vacuum actuators and the vacuum reservoir. Further still, reservoir vacuum may be estimated when the vacuum reservoir can supply vacuum to the vacuum actuator(s). Additionally, the estimating of air fill in the vacuum reservoir may accommodate for changes in vehicle altitude by using a normalized initial volume of air in the vacuum reservoir.

Figure 6:
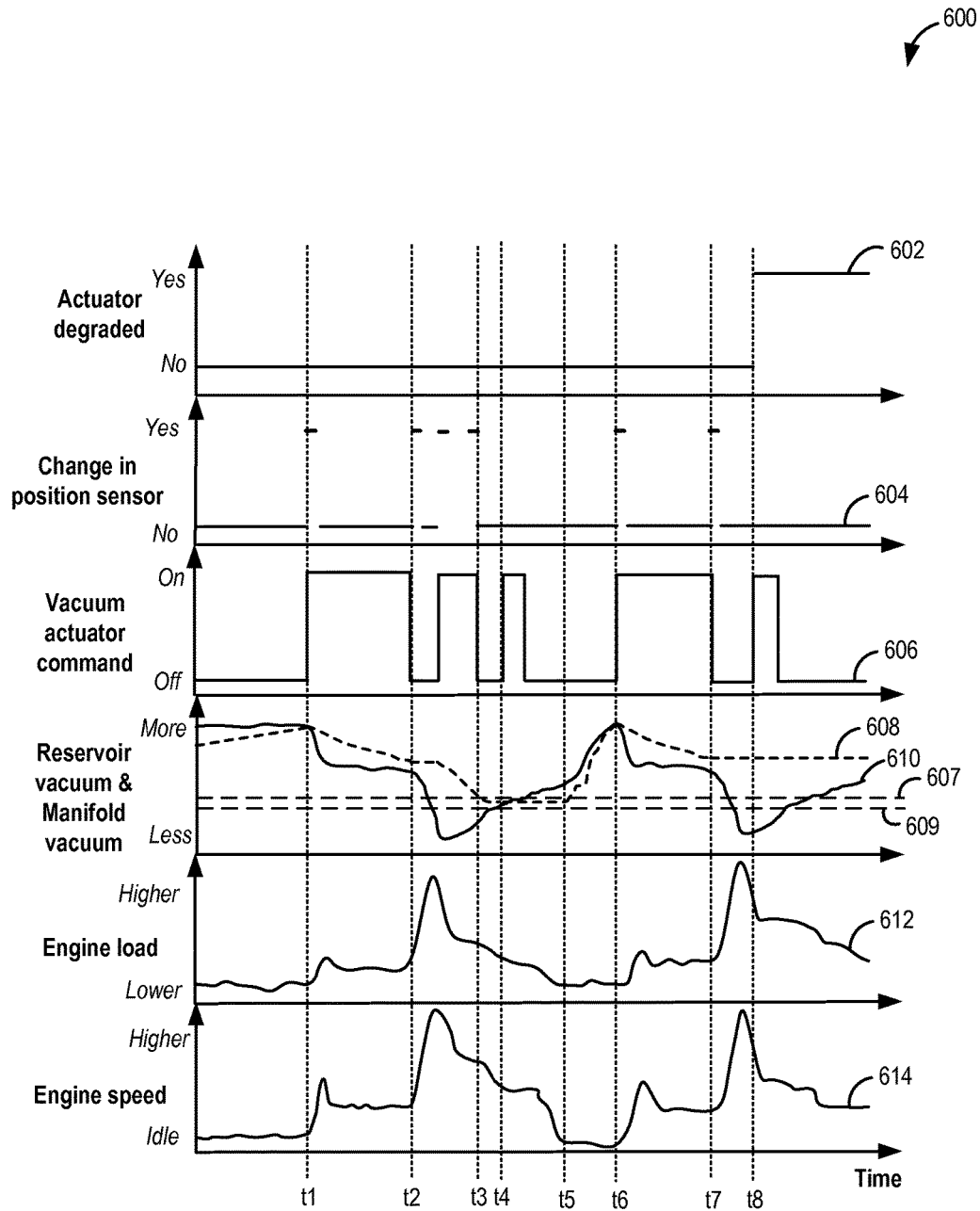
FIG. 6 depicts an example diagnosis of the vacuum actuator according to the present disclosure.

FIG. 6 depicts map 600 illustrating an example diagnosis of a vacuum actuated valve (such as a CMCV) or a vacuum actuator, such as either of CMCV actuators 75 and 77 of FIG. 1, based on the vacuum fill level in the vacuum reservoir coupled in an engine. Map 600 includes a diagnosis of degraded vacuum actuator (or the vacuum actuated valve) at plot 602, a change in position sensor at plot 604, actuation of the vacuum actuator at plot 606, reservoir vacuum at plot 608 (dashed line), manifold vacuum at plot 610, engine load at plot 612, and engine speed at plot 614. All the above are plotted against time on the x-axis, and time increases from the left of map 600 to the right of map 600. Line 607 represents the first threshold for vacuum, such as first threshold Threshold_P, and line 609 represents the second threshold for vacuum, such as Threshold_V. It will be noted that the example diagnosis shows variations in manifold vacuum and reservoir vacuum, not manifold pressure and reservoir pressure. As such, when manifold vacuum is lower than reservoir vacuum, manifold absolute pressure (MAP) is higher than reservoir absolute pressure (RAP). Likewise, when manifold vacuum is higher than reservoir vacuum, MAP is lower than RAP. Thus, a higher level of vacuum indicates substantially lower pressures, e.g. a lower absolute pressure. It will also be noted that though the first threshold (Threshold_P) and the second threshold (Threshold_V) are depicted herein as separate thresholds, in some examples, these thresholds may be the same. For example, each of Threshold_P and Threshold_V may be 7 inches of mercury. In another example, both the first threshold and the second threshold may be 8 inches of mercury.

Prior to t1, the engine may be at idle as indicated by plot 614, and therefore, engine load may be lower. At idle, manifold vacuum (plot 610) may be higher since the intake throttle may be closed when the engine is operating. Further, manifold vacuum is considerably higher than the second threshold, Threshold_V, represented by line 609. Reservoir vacuum (plot 608) may increase prior to t1, as air is drawn from the vacuum reservoir into the intake manifold. By t1, reservoir vacuum may be substantially the same as manifold vacuum. Furthermore, at idle, the CMCV may not be adjusted and may be retained in an open position, thereby, the vacuum actuator controlling the CMCV may be in an "OFF" position until t1. Further, without an actuation, the position sensor may not indicate a change (plot 604).

At t1, engine speed may increase initially as the vehicle starts moving and may stabilize later at a lower speed. As an example, a vehicle operator may depress an accelerator pedal and engine speed may increase initially in response to the change in position of the accelerator pedal. Simultaneously, engine load may increase slightly between t1 and t2. In response to the change in accelerator pedal position, the intake throttle may be opened and manifold vacuum may decrease between t1 and t2. To enable improved combustion and burn rates, the CMCVs may be actuated to a mostly closed or closed position (plot 606). The actuation and resulting change in position of the CMCVs is indicated by the position sensor at t1. Further, since vacuum in the vacuum reservoir is higher than the manifold vacuum at t1, actuation of the vacuum actuator draws vacuum from the vacuum reservoir and not from the intake manifold. Consequently, vacuum in the vacuum reservoir decreases between t1 and t2 due to the sustained actuation of the vacuum actuator.

At t2, in response to a tip-in, engine speed increases significantly along with a corresponding increase in engine load. As such, the intake throttle may be wide open and manifold vacuum decreases considerably, and substantially below line 609 (Threshold_V), due to the increase in manifold pressure. At t2, the vacuum actuator may be deactivated and the CMCVs may be moved to an open position to enable a desired higher air flow into the intake in response to the tip-in. Accordingly, the position sensors indicate a change in position at t2. The tip-in event may be followed by a decrease in engine speed and engine load, as the vehicle speed stabilizes. Further, between t2 and t3, the vacuum actuator may be actuated for a short period to move the CMCVs into a slightly closed, or mostly closed position. Accordingly, reservoir vacuum may decrease between t2 and t3. As such, the decrease in reservoir vacuum may also be due to leakage flow during the sustained actuation. Further, as the CMCV is deactivated and the actuator is commanded OFF, at t3, reservoir vacuum decreases below the first threshold, Threshold_P as represented by line 607. Further, the controller may set a flag to indicate low vacuum in the reservoir.

At t4, the vacuum actuator may be actuated to activate the CMCVs to a more closed position. However, since the reservoir vacuum is below Threshold_P and cannot supply the requisite vacuum to actuate the vacuum actuator, the CMCVs may not change position (plot 604) at t4. Further, the controller may not indicate actuator degradation based on the lack of responsiveness of the CMCVs since reservoir vacuum is determined to be lower than the first threshold, Threshold_P (line 607). Alternatively, when the controller sets the flag at t3 to indicate low vacuum in the vacuum reservoir, as in reservoir vacuum being below the first threshold, Threshold_P (line 607), the controller may additionally preclude the command to the vacuum actuator at t4.

Between t4 and t5, the vehicle may slow down, and consequently, engine speed may decrease along with engine load. Further, at t5, idling conditions may resume such that engine speed is at idle speed and the engine load is nominal. As an example, the vehicle may be idling at a stop light. In response to the idling conditions, the intake throttle may be closed resulting in an increase in manifold vacuum. Between t5 and t6, manifold vacuum increases significantly above Threshold_V, and the intake manifold supplies vacuum to the vacuum reservoir enabling a rise in reservoir vacuum to higher than the first threshold, Threshold_P (line 607). At t6, reservoir vacuum may be substantially the same as manifold vacuum. At t6, engine speed and engine load may increase again. In response to the increase in engine speed, manifold vacuum may reduce considerably. Further, the vacuum actuator may be commanded to close (or activate) the CMCVs at t6. In response to this command, vacuum may be supplied from the vacuum reservoir to the vacuum actuators resulting in a decrease in reservoir vacuum. The position sensors indicate the change in position of the CMCVs at t6.

At t7, another tip-event may occur whereupon the intake throttle may be opened wide leading to a significant reduction in manifold vacuum. Herein, manifold vacuum may decrease below Threshold_V (line 609). Simultaneously, the CMCV actuators may be activated to adjust the CMCVs to their open position. At t8, engine speed and load decrease as the tip-in event may end and the vehicle may be traveling at steady speed. To enable an improved burn rate, the CMCV actuators may be commanded to close the CMCVs. However, the position sensors do not indicate a change in position in response to the command, at t8. Estimation of reservoir vacuum indicates that the vacuum reservoir has sufficient vacuum (higher than Threshold_P, line 607). Thus, the controller indicates a degraded actuator (or stuck CMCV) in response to the lack of responsiveness of the vacuum actuated valve and the level of vacuum fill in the vacuum reservoir being higher than the first threshold, Threshold_P (plot 602).

As will be appreciated, the above examples include diagnosing degradation of vacuum actuators such as CMCV actuators and/or vacuum actuated valves such as CMCVs. The methods and routines described herein may also be utilized for other vacuum actuators and/or vacuum actuated valves.

Thus, an example method may comprise estimating a total amount of vacuum fill level in a vacuum reservoir in an engine, actuating a vacuum actuated valve, and if the vacuum actuated valve does not move in response to the actuating, indicating degradation of the vacuum actuated valve when the vacuum fill level is higher than a threshold, and not indicating degradation of the vacuum actuated valve when the vacuum fill level is estimated to be lower than the threshold. The method may further comprise setting a first diagnostic code in response to indicating degradation of the vacuum actuated valve. In response to determining that the vacuum fill level is lower than the threshold, the method may also include deactivating the vacuum actuated valve until the vacuum fill level increases to the threshold. The vacuum actuated valve, in one example, may be positioned downstream of an intake throttle in an intake passage of the engine. Further, the vacuum fill level may be estimated based upon flow of air into and out of the vacuum reservoir in response to one or more of an actuation of the vacuum actuated valve, leakage during the actuation, and aspirator suction flow. Flow of air into the vacuum reservoir may be based on a number of successive actuations of the actuator and a leakage during each actuation of the actuator, and outflow of air from the vacuum reservoir may include air drawn from the vacuum reservoir by an aspirator.

In this way, degradation of a vacuum actuator may be more reliably determined. Vacuum fill in the vacuum reservoir that supplies vacuum to the vacuum actuator may be monitored in a simple manner by estimating flow of air into and out of the vacuum reservoir during certain conditions. By estimating vacuum in the vacuum reservoir, erroneous indications of degradation in the vacuum actuator or vacuum actuated valve may be reduced. As such, a lack of movement in the vacuum actuated valve or vacuum actuator may be attributed to insufficient vacuum fill in the vacuum reservoir. By lowering a likelihood of erroneous indications of degradation, unnecessary and costly diagnostics of the vacuum actuators may also be avoided. Overall, maintenance expenses may be reduced and customer satisfaction may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
estimating an amount of vacuum fill level in a vacuum reservoir in an engine;
actuating a vacuum actuated valve with a vacuum actuator coupled to the vacuum actuated valve by providing vacuum from the vacuum reservoir to the vacuum actuator, the vacuum actuated valve and the vacuum actuator positioned separate from check valves; and if the vacuum actuated valve does not move in response to the actuating,
   indicating degradation of the vacuum actuated valve when the amount of vacuum fill level is higher than a threshold; and
   not indicating degradation of the vacuum actuated valve when the amount of vacuum fill level is estimated to be lower than the threshold, even if one or more position sensors indicate that the vacuum actuated valve did not move in response to the actuating.

2. The method of claim 1, further comprising setting a first diagnostic code in response to indicating degradation of the vacuum actuated valve, wherein the vacuum actuated valve is a charge motion control valve coupled through a solenoid valve to the check valve.

3. The method of claim 2, further comprising, in response to determining that the amount of vacuum fill level is lower than the threshold, deactivating the vacuum actuated valve until the amount of vacuum fill level increases to the threshold.

4. The method of claim 3, wherein the vacuum actuated valve is positioned downstream of an intake throttle in an intake passage of the engine.

5. The method of claim 3, wherein the amount of vacuum fill level is estimated based upon flow of air into and out of the vacuum reservoir in response to one or more of an actuation of the vacuum actuated valve, leakage during the actuation, and aspirator suction flow.

* * * * *